US011822279B2

(12) United States Patent
Kasahara

(10) Patent No.: US 11,822,279 B2
(45) Date of Patent: Nov. 21, 2023

(54) IMAGE FORMING APPARATUS, INFORMATION PROCESSING METHOD, PRINTING SYSTEM, AND STORAGE MEDIUM FOR PERFORMING REPRINTING

(71) Applicant: CANON KABUSHIKI KAISHA, Tokyo (JP)

(72) Inventor: Aya Kasahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/817,615

(22) Filed: Aug. 4, 2022

(65) Prior Publication Data
US 2023/0082522 A1 Mar. 16, 2023

(30) Foreign Application Priority Data
Aug. 11, 2021 (JP) ................................. 2021-131093

(51) Int. Cl.
*G03G 15/00* (2006.01)
*H04N 1/00* (2006.01)
*H04N 1/32* (2006.01)

(52) U.S. Cl.
CPC ......... *G03G 15/70* (2013.01); *H04N 1/00832* (2013.01); *H04N 1/32224* (2013.01)

(58) Field of Classification Search
CPC ..................................................... G03G 15/70
USPC ........................................... 358/1.15, 5, 1.18
See application file for complete search history.

(56) References Cited

U.S. PATENT DOCUMENTS

2019/0333204 A1* 10/2019 Uchida .................. G06V 10/25
2021/0067649 A1* 3/2021 Okajima ............ H04N 1/00639

FOREIGN PATENT DOCUMENTS

JP 2018-031963 A 3/2018

* cited by examiner

*Primary Examiner* — Jacky X Zheng
(74) *Attorney, Agent, or Firm* — Canon U.S.A., Inc. IP Division

(57) ABSTRACT

A printing system includes a product inspection unit configured to perform product inspection on a print product based on a scanned image generated by reading the print product with an image printed thereon and correct answer images stored in advance, a post-processing unit configured to perform post-processing on the print product, and a control unit configured to, upon occurrence of a jam in the print product, control the printing unit to perform reprinting, wherein, upon occurrence of a jam while the post-processing is performed, the product inspection unit is notified of identification information regarding the print product on which printing is started by the reprinting, and wherein, based on the identification information, the product inspection unit references any of the correct answer images corresponding to a scanned image generated by the reprinting and performs the product inspection on the print product.

14 Claims, 14 Drawing Sheets

FIG.7

PLEASE SELECT JOBS TO BE EXECUTED.

| | JOB NAME | DATE AND TIME OF RECEPTION |
|---|---|---|
| ☑ | BILL | 20XX/MM/DD |
| ☑ | ESTIMATE | 20XX/MM/DD |
| ☑ | PAMPHLET | 20XX/MM/DD |
| ☐ | APPROVAL | 20XX/MM/DD |
| | | |
| | | |

[ NEXT ]   [ CANCEL ]

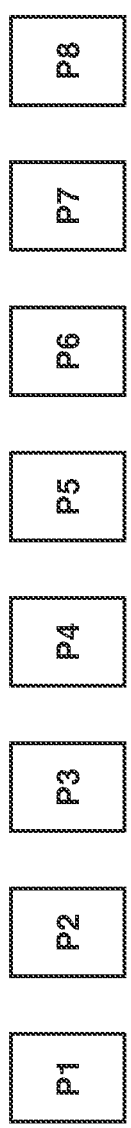
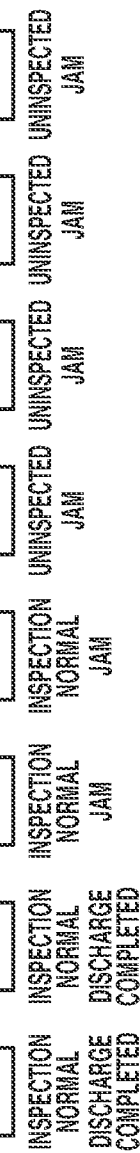
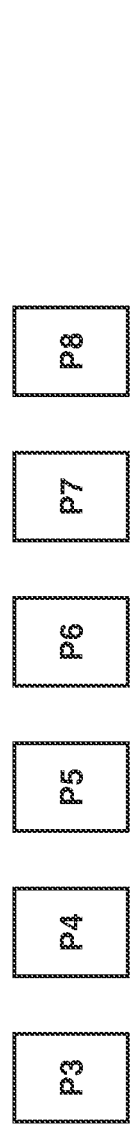
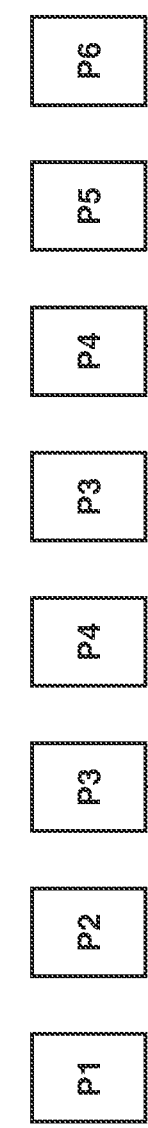
FIG. 10A PRINT JOB
FIG. 10B JAM STATE
FIG. 10C PRINTING AFTER RECOVERY FROM JAM
FIG. 10D SHEETS TO PASS THROUGH PRODUCT INSPECTION APPARATUS
FIG. 10E GROUP OF CORRECT ANSWER IMAGES REGISTERED IN PRODUCT INSPECTION APPARATUS

IMAGE FORMING APPARATUS, INFORMATION PROCESSING METHOD, PRINTING SYSTEM, AND STORAGE MEDIUM FOR PERFORMING REPRINTING

BACKGROUND

Field of the Disclosure

The present disclosure relates to an image forming apparatus, an information processing method, a printing system, and a storage medium.

Description of the Related Art

In recent years, there has been known a printing system in which while a print product subjected to printing by an image forming apparatus is conveyed to a sheet discharge tray, a product inspection apparatus performs product inspection on the print product. In the product inspection on the print product, an image is read by scanning the print product that is being conveyed, and the product inspection apparatus compares the read image and a correct answer image registered in advance, thereby determining whether the print product is normal.

In a printing system including a product inspection apparatus, while a print product is conveyed from the product inspection apparatus to a sheet discharge tray, the print product may cause a paper jam (a jam). In this case, a sheet having passed through the product inspection apparatus is a jam sheet. In printing for recovery from the jam, the printing is performed again from the sheet that has caused the jam, and thus the product inspection apparatus also performs product inspection on the sheet again. The product inspection apparatus, however, cannot recognize that the printing for recovery from the jam is being performed. Thus, if the printing for recovery from the jam is performed after the jam has occurred, then depending on the position of the jam, a sheet having the same print content may be subjected to the product inspection twice and determined as a defective sheet in sheet redundancy product inspection. Specifically, for example, if a jam occurs in the third page and the product inspection is completed up to the fourth page, the product inspection apparatus references the fifth page even though a correct answer image that is to be referenced by the product inspection apparatus is the third page. Thus, this print product is determined as a defective sheet. The publication of Japanese Patent Application Laid-Open No. 2018-31963 discusses a technique in which, if a jam occurs while a print product is conveyed from a product inspection apparatus to a sheet discharge tray, an operator identifies a jam sheet, which is the sheet that has caused the jam, and the operator sets the product inspection apparatus to perform product inspection from the jam sheet again.

SUMMARY

According to embodiments of the present disclosure, a printing system includes a controller having one or more processors and one or more memories, the controller configured to function as a printing unit configured to print an image on a recording sheet, a storage unit configured to store a plurality of correct answer images, a generation unit configured to read a print product obtained by the printing unit printing the image on the recording sheet and generate a scanned image, a product inspection unit configured to perform product inspection on the print product based on the scanned image generated by the generation unit and the correct answer images stored in the storage unit, a post-processing unit configured to perform post-processing on the print product, a control unit configured to, upon occurrence of a jam in the print product, control the printing unit to perform reprinting, and a notification unit configured to, upon the occurrence of the jam while the post-processing unit performs the post-processing on the print product, notify the product inspection unit of identification information regarding the print product on which printing is started by the reprinting, wherein based on the identification information, the product inspection unit references any of the correct answer images corresponding to the scanned image generated by the reprinting based on the control of the control unit and performs the product inspection on the print product.

Further features of the present disclosure will become apparent from the following description of exemplary embodiments with reference to the attached drawings.

BRIEF DESCRIPTION OF THE DRAWINGS

FIG. 7 illustrates an example of a display screen for selecting product inspection jobs to be executed by an external controller.

FIGS. 10A to 10E are diagrams illustrating a pattern where sheets are determined as defective sheets in sheet redundancy product inspection due to occurrence of a jam.

DESCRIPTION OF THE EMBODIMENTS

With reference to the attached drawings, exemplary embodiments of the present disclosure will be described in detail. The following exemplary embodiments do not limit the disclosure, and not all the combinations of the features described in the exemplary embodiments are deemed to be essential. The present exemplary embodiments are described using an image processing apparatus as an example of an information processing apparatus, but are not limited to this.

With reference to the drawings, exemplary embodiments of the present disclosure will be described below. Embodiments of the present disclosure are directed to a printing system that, in a case where a jam of a sheet occurs on a sheet conveying path from a product inspection apparatus to a sheet discharge tray, can accurately determine a correct answer image that is to be referenced by the product inspection apparatus when printing for recovery from the jam is performed.

A first exemplary embodiment is described. An external controller according to the present exemplary embodiments is also termed an image processing controller, a digital front end (DFE), or a print server. An image forming apparatus according to the present exemplary embodiment is also termed a multifunction peripheral (MFP).

Figure 1:
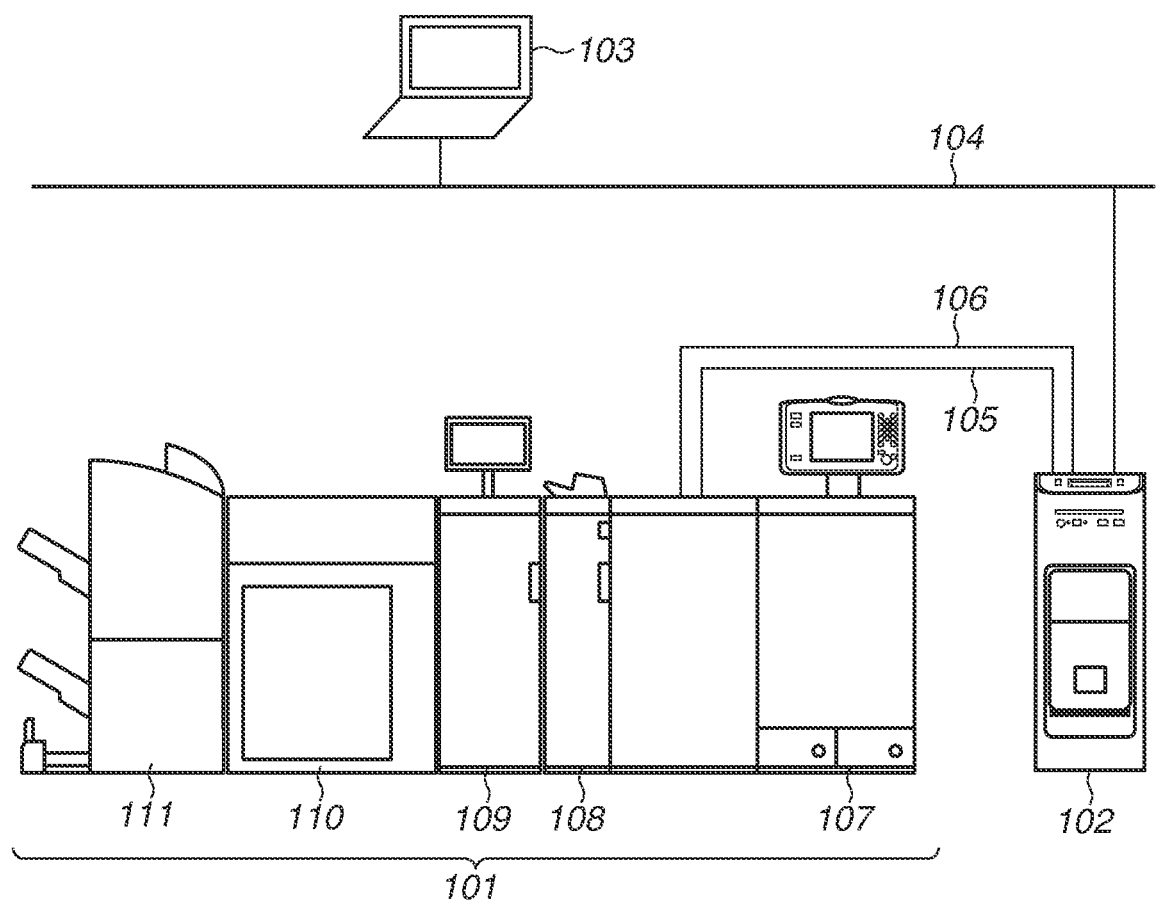
FIG. 1 is a diagram illustrating an example of an entire a hardware configuration of a printing system.

FIG. 1 is a diagram illustrating the entirety of the hardware configuration of an image processing system according to the present exemplary embodiment. The image processing system includes an image forming apparatus 101 and an external controller 102. The image forming apparatus 101 and the external controller 102 are connected together via an internal local area network (LAN) 105 and a video cable 106 so that the image forming apparatus 101 and the external controller 102 can communicate with each other. The external controller 102 is connected to a client personal computer (PC) 103 via an external LAN 104 so that the external controller 102 can communicate with the client PC 103. The PC 103 issues a print instruction to the external controller 102.

On the client PC 103, a printer driver having the function of converting print data into a print description language that can be processed by the external controller 102 is installed. An operator who performs printing can issue a print instruction via the printer driver from various applications. Based on a print instruction from the operator, the printer driver transmits print data to the external controller 102. If the external controller 102 receives a print instruction from the PC 103, the external controller 102 performs data analysis and a rasterization process on the print data, inputs the resulting print data to the image forming apparatus 101, and issues a print instruction to the image forming apparatus 101.

Next, the image forming apparatus 101 is described. Various apparatuses having a plurality of different functions are connected to the image forming apparatus 101, and the image forming apparatus 101 is configured to perform a complex printing process such as bookbinding.

A printing apparatus 107 forms an image using toner on a sheet conveyed from a sheet feeding unit in a lower portion of the printing apparatus 107. The sheet may be paper or film, and refers to a recording sheet on which an image is to be formed using toner. The configuration and the operating principle of the printing apparatus 107 are as follows. The printing apparatus 107 emits a light beam such as laser light modulated according to image data, which is reflected by a rotary polygon mirror such as a polygon mirror, and irradiates a photosensitive drum with the reflected laser light as scanning light. An electrostatic latent image formed on the photosensitive drum by the laser light is developed using toner, and the developed toner image is transferred to a sheet attached to a transfer drum. The printing apparatus 107 sequentially executes a series of operations of this image formation process using toner of yellow (Y), magenta (M), cyan (C), and black (K), thereby forming a full-color image on the sheet. The sheet on the transfer drum on which the full-color image is formed is conveyed to a fixing device. The fixing device includes a roller, a belt and a heat source such as a halogen heater built into the roller. The fixing device melts by heat and pressure the toner on the sheet to which the toner image is transferred, thereby fixing the toner image to the sheet.

An inserter 108 inserts an insertion sheet. The inserter 108 can insert a sheet at any position in a group of sheets that is subjected to printing by the printing apparatus 107 and conveyed.

A product inspection apparatus 109 is an apparatus that reads an image on a conveyed sheet and compares the image and a correct answer image registered in advance, thereby determining whether the printed image is normal.

A large-capacity stacker 110 can store a large number of sheets therein.

A finisher 111 performs a finishing process on a conveyed sheet. The finishing process is a process of stapling, punching, or saddle stitch binding on a sheet on which an image is printed. The sheet subjected to the finishing process is discharged to a sheet discharge tray.

The printing system described with reference to FIG. 1 has a configuration in which the external controller 102 is connected to the image forming apparatus 101. The present exemplary embodiment, however, is not limited to a configuration in which the external controller 102 is connected.

That is, a configuration may be employed in which the image forming apparatus 101 is connected to the external LAN 104, and the client PC 103 transmits print data that can be processed by the image forming apparatus 101 to the image forming apparatus 101. In this case, the image forming apparatus 101 performs data analysis and a rasterization process on the print data and executes a printing process on the resulting print data.

Figure 2:
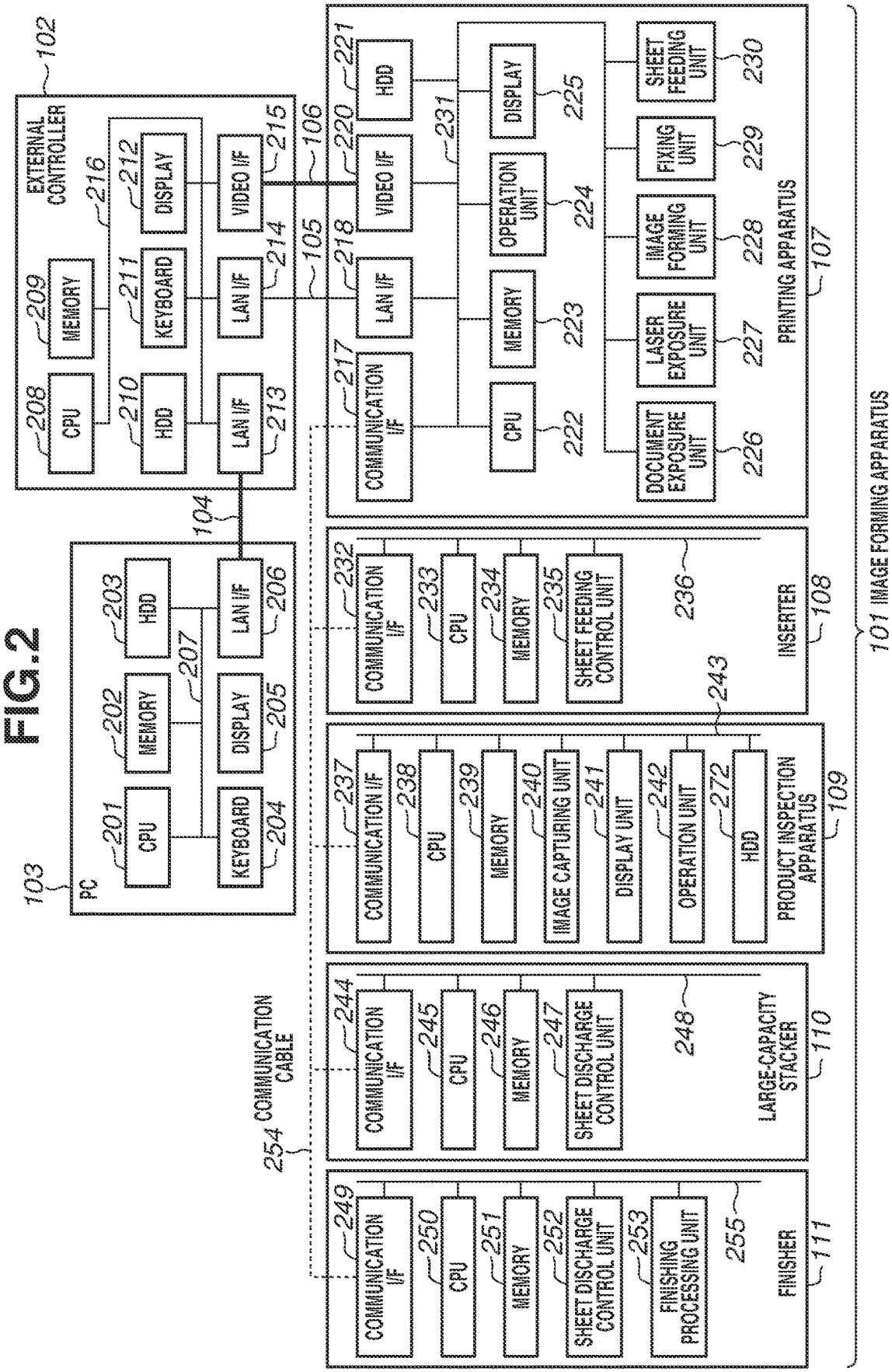
FIG. 2 is a block diagram illustrating an example of a system configuration of the printing system.

FIG. 2 is a block diagram illustrating the system configuration of the image forming apparatus 101, the external controller 102, and the client PC 103.

First, the configuration of the printing apparatus 107 of the image forming apparatus 101 is described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feeding unit 230. These components are connected together via a system bus 231.

The communication I/F 217 is connected to the inserter 108, the product inspection apparatus 109, the large-capacity stacker 110, and the finisher 111 via a communication cable 254, and communication for control of each apparatus is performed via the communication I/F 217.

The LAN I/F 218 is connected to the external controller 102 via the internal LAN 105, and print data is communicated via the LAN I/F 218.

The video I/F 220 is connected to the external controller 102 via the video cable 106, and image data is communicated via the video I/F 220.

The HDD 221 is a storage device that stores programs and data. Based on the programs stored in the HDD 221, the CPU 222 controls image processing and comprehensively controls printing.

The memory 223 stores programs necessary for the CPU 222 to perform various processes and image data and operates as a work area.

The operation unit 224 receives inputs of various settings and an instruction to perform an operation from the operator.

The display 225 displays setting information regarding the image processing apparatus and the processing status of a print job.

The document exposure unit 226 performs the process of reading a document when a copy function or a scan function is used. The document exposure unit 226 captures an image using a charge-coupled device (CCD) camera while illuminating a sheet placed by the operator with an exposure lamp, thereby reading document data.

The laser exposure unit 227 is a device that performs primary charging for irradiating the photosensitive drum with laser light to transfer a toner image and also performs laser exposure. First, the laser exposure unit 227 performs primary charging for charging the surface of the photosensitive drum to a uniform negative potential. Next, a laser driver irradiates the photosensitive drum with laser light while adjusting the angle of reflection using a polygon mirror. This neutralizes the negative charge of the irradiated portion, thereby forming an electrostatic latent image.

The image forming unit 228 is a device that transfers toner to a sheet. The image forming unit 228 includes a developing unit, a transfer unit, and a toner supply unit. The image forming unit 228 transfers toner on the photosensitive drum to a sheet.

The developing unit applies negatively charged toner to an electrostatic latent image on the surface of the photosensitive drum from a developing cylinder, thereby visualizing the image. The transfer unit performs a primary transfer for applying a positive potential to a primary transfer roller and transferring toner on the surface of the photosensitive drum to a transfer belt, and a secondary transfer for applying a positive potential to a secondary transfer outer roller and transferring the toner on the transfer belt to a sheet.

The fixing unit 229 is a device that melts toner on a sheet and firmly fixes the toner to the sheet by heat and pressure. The fixing unit 229 includes a heating heater, a fixing belt, and a pressure belt. The sheet feeding unit 230 is a device that feeds a sheet. Rollers and various sensors control a sheet feeding operation and a sheet conveying operation.

Next, the configuration of the inserter 108 of the image forming apparatus 101 is described.

The inserter 108 of the image forming apparatus 101 includes a communication OF 232, a CPU 233, a memory 234, and a sheet feeding control unit 235. These components are connected together via a system bus 236. The communication I/F 232 is connected to the printing apparatus 107 via the communication cable 254, and communication necessary for control is performed via the communication I/F 232.

According to control programs stored in the memory 234, the CPU 233 performs various types of control necessary for the feeding of a sheet.

The memory 234 is a storage device that stores the control programs. Based on an instruction from the CPU 233, the sheet feeding control unit 235 controls the feeding and the conveyance of a sheet conveyed from a sheet feeding unit of the inserter 108 or the printing apparatus 107 while controlling a roller and a sensor.

Next, the configuration of the product inspection apparatus 109 of the image forming apparatus 101 is described. The product inspection apparatus 109 of the image forming apparatus 101 includes a communication I/F 237, a CPU 238, a memory 239, an image capturing unit 240, a display unit 241, an operation unit 242, and an HDD 272. These components are connected together via a system bus 243.

The communication I/F 237 is connected to the printing apparatus 107 via the communication cable 254, and communication necessary for control is performed via the communication I/F 237. A correct answer image for use in inspection is also received from the printing apparatus 107 via the communication cable 254 and the communication I/F 237 and stored in the HDD 272.

According to control programs stored in the memory 239, the CPU 238 performs various types of control necessary for product inspection.

The memory 239 is a storage device that stores the control programs.

Based on an instruction from the CPU 238, the image capturing unit 240 captures an image on a conveyed sheet, thereby generating a scanned image.

The CPU 238 compares the scanned image generated by the image capturing unit 240 and the correct answer image stored in the HDD 272, thereby determining whether the printed image is normal.

The display unit 241 displays the result of the product inspection and a setting screen.

The operation unit 242 is operated by the operator and receives a change in the setting of the product inspection apparatus 109 or an instruction to register the correct answer image.

The HDD 272 stores the correct answer image. In a case where the HDD 272 is not disposed, a configuration may be employed in which the correct answer image is stored in the HDD 221, and when the process of determining whether the printed image is normal is performed, the correct answer image is read from the HDD 221 to the memory 239 and used.

Next, the configuration of the large-capacity stacker 110 of the image forming apparatus 101 is described. The large-capacity stacker 110 of the image forming apparatus 101 includes a communication I/F 244, a CPU 245, a memory 246, and a sheet discharge control unit 247. These components are connected together via a system bus 248. The communication I/F 244 is connected to the printing apparatus 107 via the communication cable 254, and communication necessary for control is performed via the communication I/F 244.

According to control programs stored in the memory 246, the CPU 245 performs various types of control necessary for the discharge of a sheet. The memory 246 is a storage device that stores the control programs. Based on an instruction from the CPU 245, the sheet discharge control unit 247 performs control to convey a conveyed sheet to a stack tray, an escape tray, or the finisher 111 at the subsequent stage.

Next, the configuration of the finisher 111 of the image forming apparatus 101 is described. The finisher 111 of the image forming apparatus 101 includes a communication I/F 249, a CPU 250, a memory 251, a sheet discharge control unit 252, and a finishing processing unit 253. These components are connected together via a system bus 255. The communication I/F 249 is connected to the printing apparatus 107 via the communication cable 254, and communication necessary for control is performed via the communication I/F 249.

According to control programs stored in the memory 251, the CPU 250 performs various types of control necessary for finishing and the discharge of a sheet.

The memory 251 is a storage device that stores the control programs.

Based on an instruction from the CPU 250, the sheet discharge control unit 252 controls the conveyance and the discharge of a sheet.

Based on an instruction from the CPU 250, the finishing processing unit 253 controls a finishing process such as stapling, punching, or saddle stitch binding. The finishing process does not need to include all these finishing processes such as the stapling, the punching, and the saddle stitch binding.

Next, the configuration of the external controller 102 is described.

The external controller 102 includes a CPU 208, a memory 209, an HDD 210, a keyboard 211, a display 212, a LAN I/F 213, a LAN I/F 214, and a video I/F 215. These components are connected together via a system bus 216.

Based on programs and data stored in the HDD 210, the CPU 208 comprehensively executes the process of receiving print data from the client PC 103, a raster image processor (RIP) process, and the process of transmitting print data to the image forming apparatus 101.

The memory 209 stores programs necessary for the CPU 208 to perform various processes and data and operates as a work area.

The HDD 210 stores programs necessary for the operation of a printing process and data.

The keyboard 211 is a device for inputting an instruction to perform an operation to the external controller 102.

The display 212 displays information regarding an execution application for the external controller 102 using a video signal of a still image or a moving image.

The LAN I/F 213 is connected to the client PC 103 via the external LAN 104, and a print instruction is communicated via the LAN I/F 213. The LAN I/F 214 is connected to the image forming apparatus 101 via the internal LAN 105, and a print instruction is communicated via the LAN I/F 214. The video I/F 215 is connected to the image forming apparatus 101 via the video cable 106, and print data is communicated via the video I/F 215.

Next, the configuration of the client PC 103 is described. The client PC 103 includes a CPU 201, a memory 202, an HDD 203, a keyboard 204, a display 205, and a LAN I/F 206. These components are connected together via a system bus 207.

Based on a document processing program stored in the HDD 203, the CPU 201 creates print data or issues a print instruction. The CPU 201 also comprehensively controls the devices connected to the system bus 207.

The memory 202 stores programs necessary for the CPU 201 to perform various processes and data and operates as a work area.

The HDD 203 stores programs necessary for the operation of a printing process and data.

The keyboard 204 is a device for inputting an instruction to perform an operation to the PC 103.

The display 205 displays information regarding an execution application for the client PC 103 using a video signal of a still image or a moving image.

The LAN I/F 206 is connected to the external LAN 104, and a print instruction is communicated via the LAN I/F 206.

In the above description, the external controller 102 and the image forming apparatus 101 are connected to each other via the internal LAN 105 and the video cable 106, but any other configurations may be employed as long as data necessary for printing can be transmitted and received therebetween. For example, a configuration may be employed in which the external controller 102 and the image forming apparatus 101 are connected to each other via only the video cable 106. Each of the memories 202, 209, 223, 234, 239, 246, and 251 only needs to be a storage device for holding data and programs. For example, a configuration may be employed in which a volatile random-access memory (RAM), a non-volatile read-only memory (ROM), a built-in HDD, an external HDD, or a Universal Serial Bus (USB) memory is substituted for each of the memories 202, 209, 223, 234, 239, 246, and 251.

Figure 3:
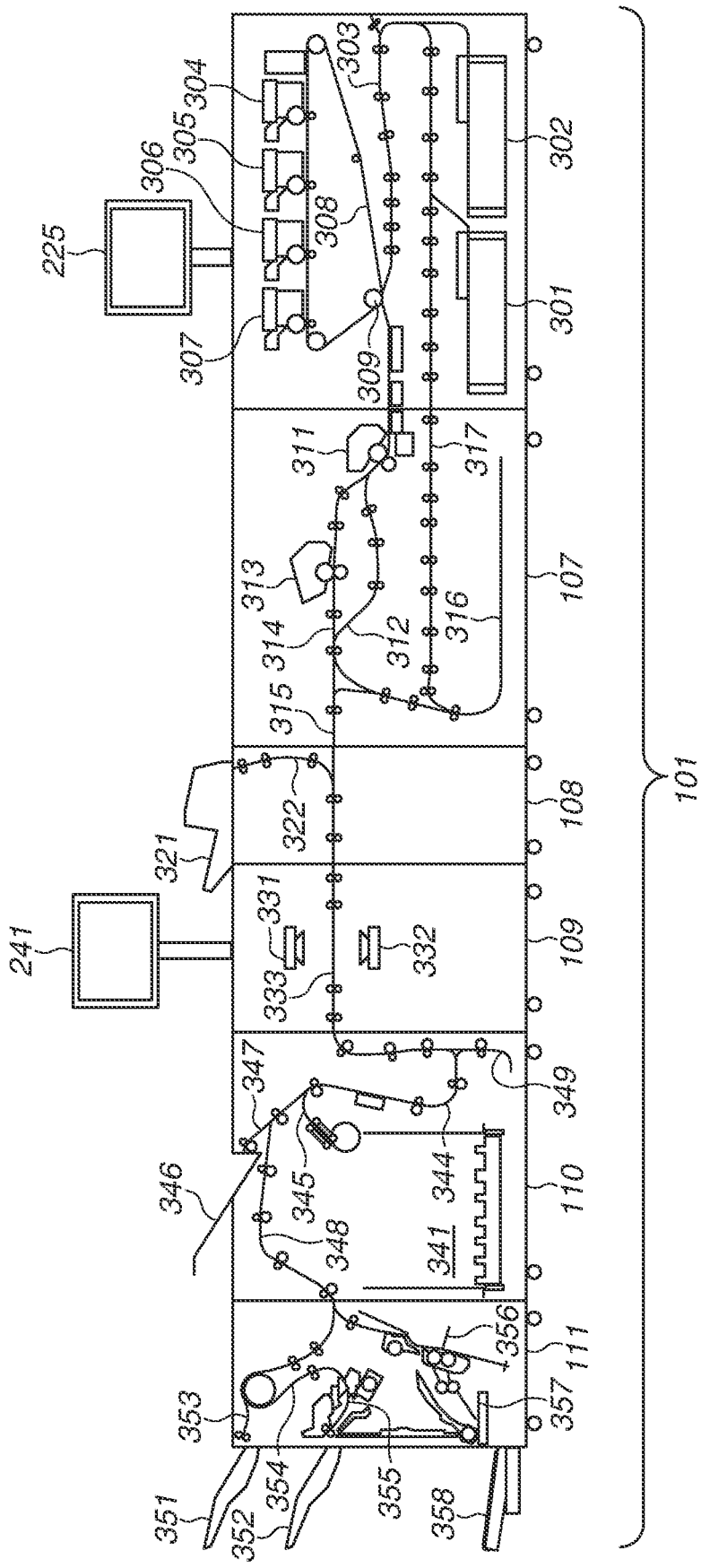
FIG. 3 is a schematic diagram illustrating an example of a mechanical cross-sectional view of an image forming apparatus.

FIG. 3 is a mechanical cross-sectional view of the image forming apparatus 101.

Sheet feeding decks 301 and 302 can store various sheets. For each of the sheet feeding decks 301 and 302, information regarding the sheets (the sheet size and the sheet type) stored in the sheet feeding deck can be set by using the operation unit 224 of the printing apparatus 107. Each of the sheet feeding decks 301 and 302 can separate only the top sheet among the stored sheets and convey the separated sheet to a sheet conveying path 303.

Development stations 304 to 307 form toner images using colored toner of Y, M, C, and K, respectively, to form a color image. The toner images formed at this time are primarily transferred to an intermediate transfer belt 308. The intermediate transfer belt 308 rotates clockwise in FIG. 3 and transfers the toner images to the sheet conveyed from the sheet conveying path 303 at a secondary transfer position 309.

The display 225 displays the print status of the image forming apparatus 101 or information for the settings of the image forming apparatus 101.

A fixing unit 311 fixes the toner images to the sheet. The fixing unit 311 includes a pressure roller and a heating roller. As the sheet passes between the rollers, the fixing unit 311 melts and pressurizes the toner and fixes the toner images to the sheet. The sheet having come out of the fixing unit 311 passes through a sheet conveying path 312 and is conveyed to a sheet conveying path 315. If the toner needs to be further melted and pressurized to fix the toner depending on the type of the sheet, after the sheet passes through the fixing unit 311, the sheet is conveyed to a second fixing unit 313 using an upper sheet conveying path. After the toner is additionally melted and pressurized, the sheet passes through a sheet conveying path 314 and is conveyed to the sheet conveying path 315. If the image formation mode is set to two-sided printing, the sheet is conveyed to a sheet reverse path 316, reversed in the sheet reverse path 316, and then conveyed to a two-sided conveying path 317. Then, an image is transferred to the second surface of the sheet at the secondary transfer position 309.

The inserter 108 inserts an insertion sheet. The inserter 108 includes an inserter tray 321 and causes a sheet fed via a sheet conveying path 322 to join the conveying path. Consequently, it is possible to insert a sheet at any position in a series of sheets conveyed from the printing apparatus 107 and convey these sheets to the subsequent apparatus.

The sheet having passed through the inserter 108 is conveyed to the product inspection apparatus 109. In the product inspection apparatus 109, cameras 331 and 332 are placed opposed to each other. The camera 331 is a camera that reads the upper surface of the sheet, and the camera 332 is a camera that reads the lower surface of the sheet. At the timing when the sheet conveyed to a sheet conveying path 333 reaches a predetermined position, the product inspection apparatus 109 can read an image on the sheet using the camera 331 or 332 and determine whether the image on the sheet is normal. The display unit 241 displays the result of product inspection performed by the product inspection apparatus 109.

The large-capacity stacker 110 can store a large number of sheets. The large-capacity stacker 110 includes a stack tray 341 as a tray for stacking a sheet. The sheet having passed through the product inspection apparatus 109 is input to the large-capacity stacker 110 through a sheet conveying path 344. The sheet is conveyed from the sheet conveying path 344, passes through a sheet conveying path 345, and is stacked in the stack tray 341. Further, the large-capacity stacker 110 includes an escape tray 346 as a sheet discharge tray. The escape tray 346 is a sheet discharge tray used to discharge a sheet determined as a defective sheet by the product inspection apparatus 109. To output the sheet to the escape tray 346, the sheet is conveyed from the sheet conveying path 344, passes through a sheet conveying path 347, and is conveyed to the escape tray 346. To convey the sheet to a post-processing apparatus at the subsequent stage of the large-capacity stacker 110, the sheet is conveyed via a sheet conveying path 348.

In this manner, if the product inspection apparatus 109 determines a sheet as a defective sheet, printing is suspended, and the defective sheet and subsequent sheets that are already fed are discharged to a sheet discharge destination different from that of a normal sheet. This can prevent the defective sheet from being mixed in with the normal sheet. After the defective sheet and the subsequent sheets that are already fed are all discharged, the printing is resumed from the sheet in which the defect occurs, thereby continuing the printing from the defective sheet. An operation in a case where a sheet is determined as a defective sheet is not limited to this.

A reverse unit 349 reverses the sheet. The reverse unit 349 is used to stack the sheet in the stack tray 341. To stack the sheet in the stack tray 341 so that the direction of the sheet when the sheet is input to the large-capacity stacker 110 and the direction of the sheet when the sheet is output are the same as each other, the sheet is reversed once by the reverse unit 349. To convey the sheet to the escape tray 346 or the post-processing apparatus at the subsequent stage, the sheet is discharged as it is without flipping the sheet when the sheet is stacked. Thus, the operation of reversing the sheet in the reverse unit 349 is not performed.

The finisher 111 is an apparatus that performs a finishing process on the conveyed sheet according to a function specified by the operator. Specifically, the finisher 111 has a finishing function such as stapling, e.g., one-point or two-point binding, punching, e.g., two-hole or three-hole punching, or saddle stitch binding. The finishing function does not need to include all these finishing functions such as the stapling, the punching, and the saddle stitch binding. The finisher 111 includes two sheet discharge trays 351 and 352. If the finishing process such as the stapling is not to be performed, the sheet is output to the sheet discharge tray 351 via a sheet conveying path 353. If, on the other hand, the finishing process such as the stapling is to be performed, the sheet is conveyed via a sheet conveying path 354, and a finishing function specified by the user is executed on the sheet by a processing unit 355. Then, the sheet is output to the sheet discharge tray 352. Each of the sheet discharge trays 351 and 352 can rise and fall. With the sheet discharge tray 351 moved down, the sheet subjected to the finishing process by the processing unit 355 can be discharged to and stacked in the sheet discharge tray 351. If the saddle stitch binding is specified, after a saddle stitch processing unit 356 performs the stapling process on the center of the sheet, the sheet is folded in two and output to a saddle stitch binding tray 358 via a sheet conveying path 357. The saddle stitch binding tray 358 is composed of a conveyor belt and configured to convey a saddle-stitched bundle of sheets stacked on the saddle stitch binding tray 358 to the left.

Figure 4:
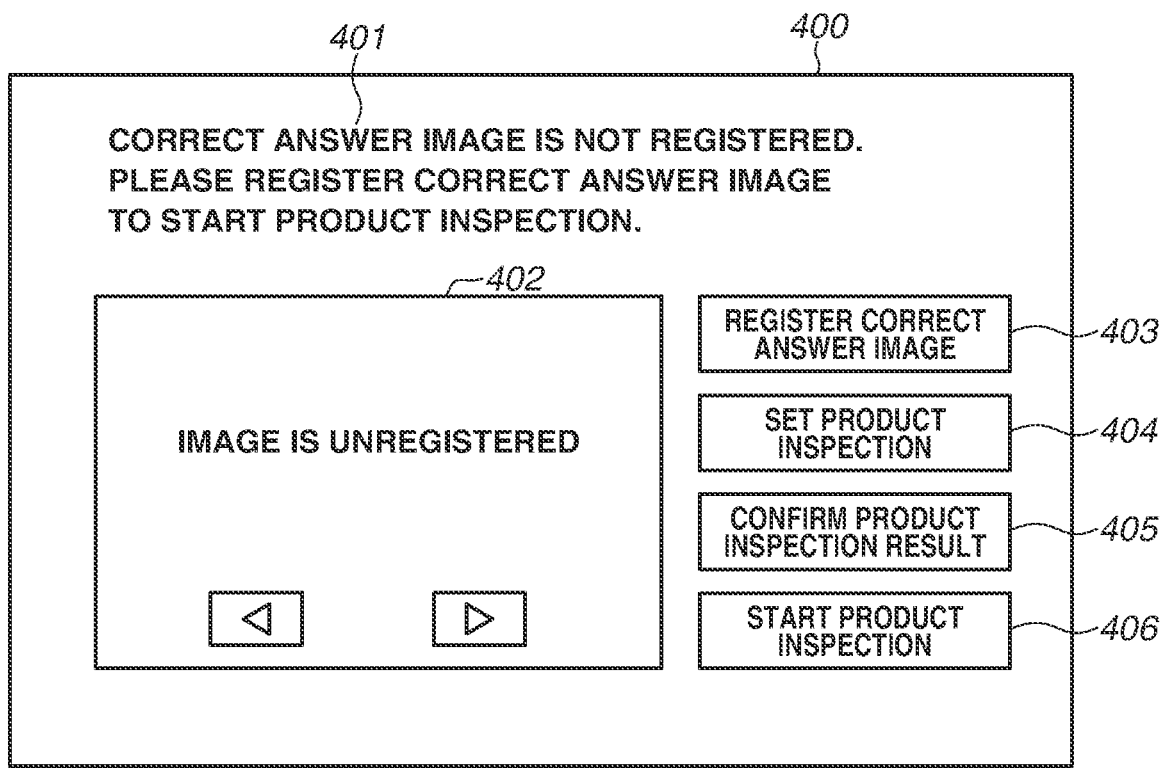
FIG. 4 illustrates an example of a display screen before a correct answer image is registered in a product inspection apparatus.
Figure 5:
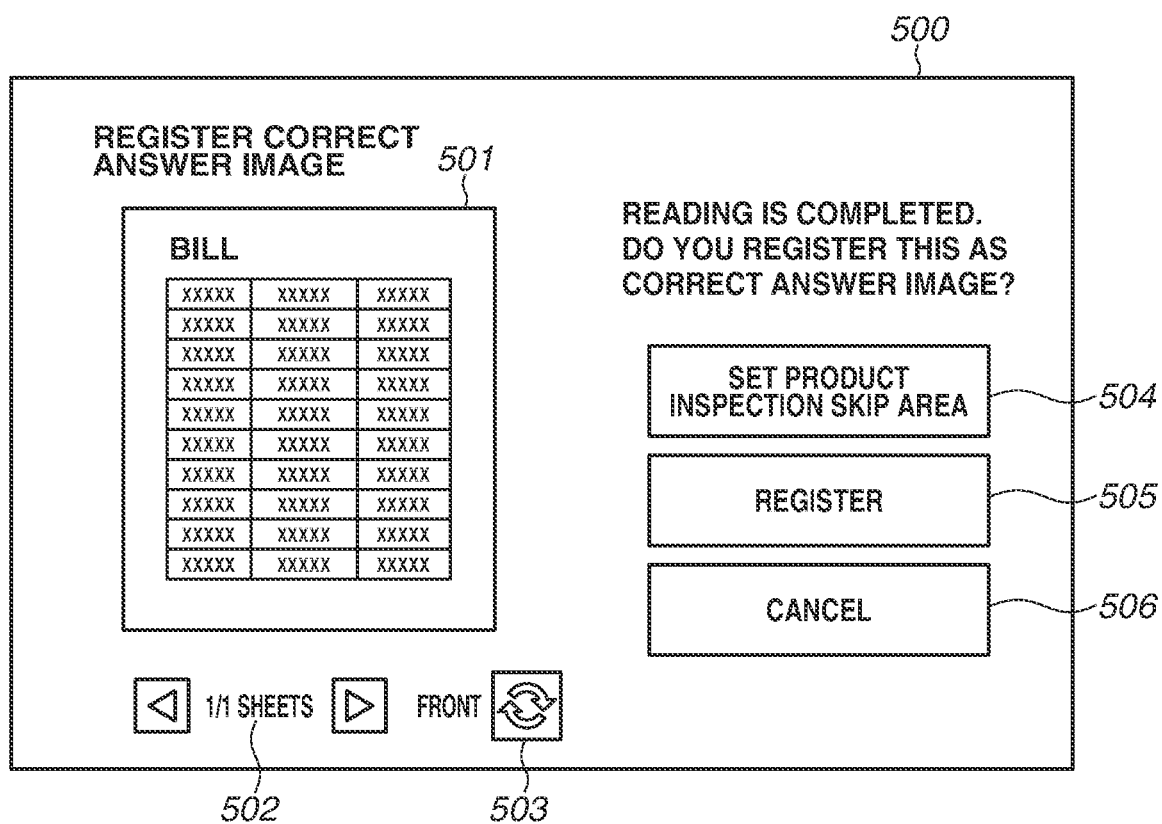
FIG. 5 illustrates an example of a display screen after the product inspection apparatus reads the correct answer image.
Figure 6:
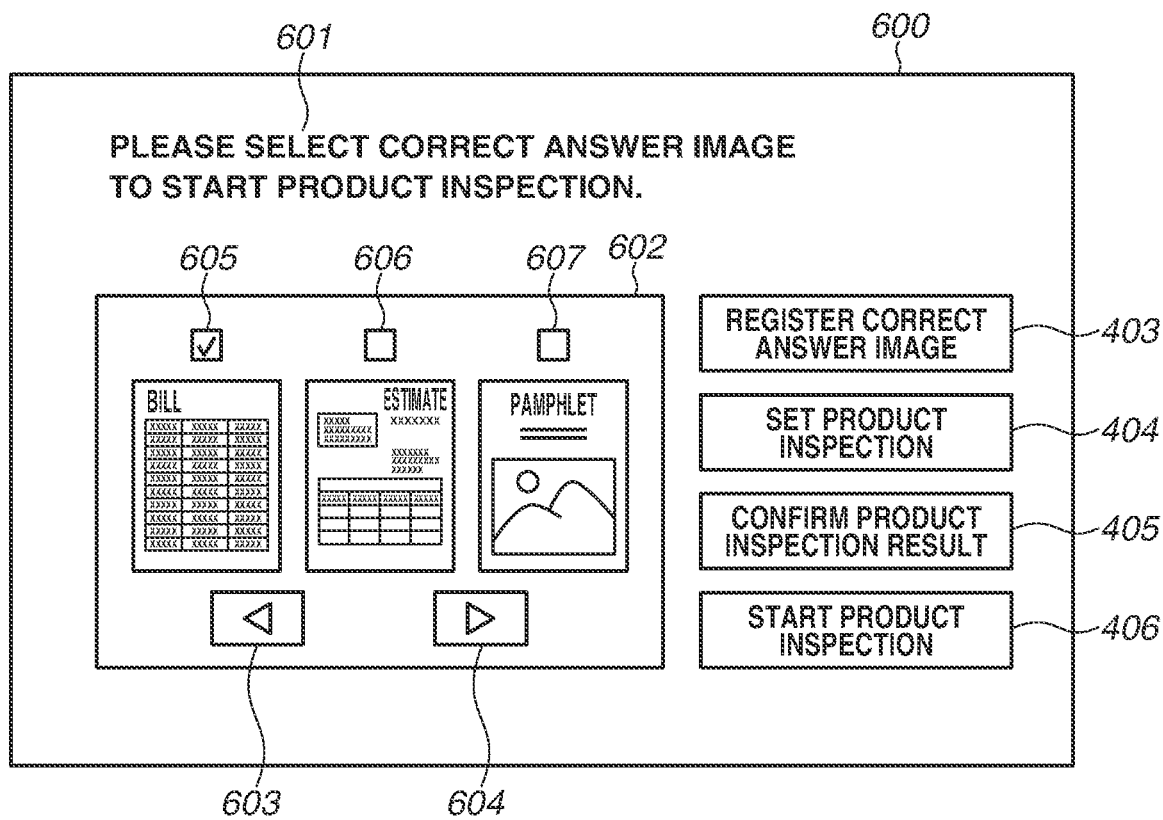
FIG. 6 illustrates an example of a display screen when a plurality of correct answer images is registered in the product inspection apparatus.

FIGS. 4 to 6 are examples of display screens of the product inspection apparatus 109, and each display screen is displayed based on an instruction from the CPU 238 of the product inspection apparatus 109. According to product inspection items set in advance, the product inspection apparatus 109 performs product inspection on a sent sheet image. The product inspection on the sheet image is performed by comparing a correct answer image set in advance and the sent sheet image. Examples of the method for comparing the images include a method for comparing pixel values with respect to each image position, a method for comparing the positions of objects by edge detection, and a method for extracting text data by optical character recognition (OCR). The product inspection items include a shift in the print position, the tint of the image, the density of the image, a streak, fading, and missing print. The inspection does not need to be performed regarding all the inspection items, and one or more items can be selected.

FIG. 4 is an example of a screen 400 displayed on the display unit 241 of the product inspection apparatus 109 when the product inspection apparatus 109 is activated.

An item 401 displays a message indicating that the correct answer image is not registered, and thus it is necessary to register the correct answer image to start the product inspection.

An item 402 displays the correct answer image that is already registered. As an example, the correct answer image is unregistered, so that the screen 400 displays a message indicating that the correct answer image is unregistered. Display in a case where the correct answer image is registered will be described below.

A button 403 is used to call a registration screen for registering the correct answer image. The correct answer image is an image as a comparison target to be compared with an image read by the product inspection apparatus 109. As the correct answer image, an image obtained by reading a print sheet which is visually confirmed to be normal is used.

A button 404 is used to call a setting screen for setting the product inspection. According to the operator's purpose of the product inspection, items for the product inspection and the accuracy of the product inspection (the degree of difference from the correct answer image to which an image is determined as a defective image) are set.

A button 405 is used to call a confirmation screen for confirming the result of the product inspection. The operator can confirm the content of the product inspection and the result of the product inspection in the past.

A button 406 is used to issue an instruction to start the product inspection. If the button 406 is pressed, the product inspection apparatus 109 shifts to a product inspection mode and notifies the printing apparatus 107 that the product inspection apparatus 109 is in the product inspection mode. If the product inspection is started, the product inspection apparatus 109 starts the product inspection on a sent sheet image.

The screens to be displayed in a case where the buttons 404 and 405 are pressed are not directly related to embodiments of the present disclosure, and therefore are not described here. The screens to be displayed in a case where the buttons 403 and 406 are pressed are described with reference to FIGS. 5 and 6.

FIG. 5 is an example of a screen 500 displayed on the display unit 241 of the product inspection apparatus 109 after the reading of the correct answer image is completed.

A display portion 501 displays an image of a print sheet read by the product inspection apparatus 109. If there is a plurality of print sheets, the displayed image can be switched using a switching button 502. If the product inspection is performed on both front and back sides of the image, the front and back sides can be switched using a switching button 503. A button 504 is used to issue an instruction to set a product inspection skip area. In this setting, an area where the product inspection is not performed can be set for printing in which the print content of a particular area is changed for each copy, such as variable printing (variable data printing (VDP)).

In the variable printing, there are a case where a different identifier (ID) is printed for each copy, and a case where only an address or a name is changed for each copy.

A button 505 is used to issue an instruction to register the correct answer image after confirming the read image in the display portion 501. If the button 505 is pressed, the product inspection apparatus 109 registers the correct answer image and returns to the display screen in FIG. 4.

A button 506 is used to cancel the reading. If the button 506 is pressed, the product inspection apparatus 109 does not register the correct answer image and returns to the display screen in FIG. 4. If the button 505 or 506 is pressed and the screen 500 returns to the display screen in FIG. 4, the product inspection apparatus 109 shifts to a normal mode where the product inspection apparatus 109 does not perform the product inspection. Then, the product inspection apparatus 109 notifies the printing apparatus 107 that the product inspection apparatus 109 is in the normal mode.

FIG. 6 illustrates an example of a home screen 600 displayed on the display unit 241 of the product inspection apparatus 109 when a plurality of correct answer images is registered.

A message 601 urges the operator to select an image for use in the product inspection from the plurality of registered correct answer images.

An item 602 displays the plurality of registered correct answer images. FIG. 6 illustrates examples of the registered correct answer images. Images of documents may be displayed as in the item 602, or only registration names may be displayed.

Scroll buttons 603 and 604 are buttons used to scroll the viewing area of the item 602 to the left and right to select correct answer images outside the viewing area.

Check boxes 605 to 607 correspond to the respective correct answer images. If an image for use in the product inspection is selected, a check mark is displayed in a corresponding one of the check boxes 605 to 607. If the "start product inspection" button 406 is pressed after the correct answer image is selected, the product inspection using the selected correct answer image is started.

To set the product inspection for the product inspection apparatus 109, the product inspection is set on the examples of the screens illustrated in FIGS. 4 to 6 displayed on the display unit 241 of the product inspection apparatus 109. On the other hand, to instruct the product inspection apparatus 109 to convey a print sheet to be registered as the correct answer image, a sheet on which a barcode is printed, or a print sheet as a product inspection target, the instruction is issued through the external controller 102.

FIG. 7 is a selection screen 700 displayed on the display 212 of the external controller 102 for selecting product inspection jobs to be executed. An item 701 indicates a list of product inspection jobs received from the client PC 103. The item 701 indicates the state where four jobs are received from the client PC 103, and indicates the state where three jobs, i.e., "bill", "estimate", and "pamphlet", are selected as examples of the jobs to be executed. If a button 702 is pressed after the jobs to be executed are selected, the selection screen 700 transitions to a setting screen for setting the product inspection jobs in FIG. 8.

Figure 8:
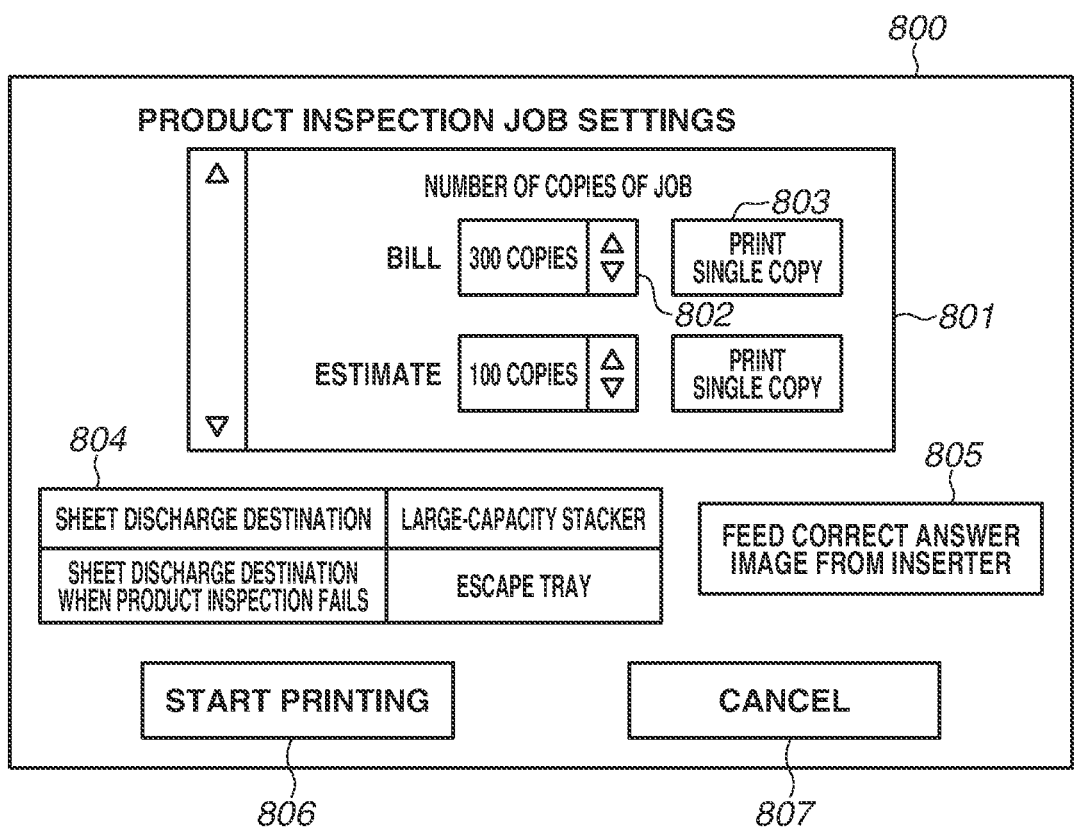
FIG. 8 illustrates an example of a display screen for setting the product inspection jobs through the external controller.

FIG. 8 is an example of a setting screen 800 displayed on the display 212 of the external controller 102 for setting the product inspection jobs.

In an item 801, each job selected on the screen 700 is set.

In an item 802, the number of copies of the job is set. In FIG. 8, as an example, print settings are made so that 300 copies of the bill and 100 copies of the estimate are printed. A button 803 is used to issue an instruction to, as an example, print only a single copy of the product inspection job corresponding to "bill".

For example, the button 803 is used to register the correct answer image in the product inspection apparatus 109. The procedure for registering the correct answer image using the button 803 is as follows.

The button 403 in FIG. 4 displayed on the display unit 241 of the product inspection apparatus 109 is pressed, thereby instructing the product inspection apparatus 109 to start registering the correct answer image. Then, the button 803 is pressed to instruct the external controller 102 to print a single copy of the corresponding product inspection job. If the instruction to print a single copy is issued, the printing apparatus 107 performs printing, and the product inspection apparatus 109 switches the correct answer image and reads a sheet and the correct answer image.

In an item 804, the sheet discharge destinations of the product inspection jobs are set. In this case, the large-capacity stacker 110 is set as a sheet discharge destination, and the escape tray 346 is set as a sheet discharge destination to which a sheet is to be discharged if it is determined by the product inspection that an image is a defective image.

A button 805 is used to instruct the inserter 108 to feed the correct answer image. The button 805 is used to cause the inserter 108 to read a print sheet already subjected to printing as the correct answer image. For example, the button 805 is used to read the correct answer image after the operator determines that the print sheet corresponds to a normal image when printing and the registration of the correct answer image are not simultaneously performed. When the button 805 is used, the operator places a print sheet to be registered as the correct answer image in advance and a sheet on which a barcode is printed on the tray 321 of the inserter 108, and then the print sheet and the sheet are conveyed to the product inspection apparatus 109. In this case, the sheet feeding unit 230 of the printing apparatus 107 may feed the sheets. However, if the sheet feeding unit 230 feeds the sheets, the sheets are pressurized and heated through the fixing unit 311 and the second fixing unit 313, and therefore, an image on the print sheet may deform. Thus, in a case where a print sheet already subjected to printing is registered as the correct answer image, it is desirable that the inserter 108 feeds the sheet so that the sheet does not pass through a fixing device.

A button 806 is used to issue an instruction to start printing the product inspection jobs. If an instruction to start printing is issued by pressing the button 806, the external controller 102 inputs the product inspection jobs to the printing apparatus 107 based on the settings in FIG. 8. For example, after the product inspection apparatus 109 is instructed to start the product inspection by pressing the button 406 in FIG. 4, the external controller 102 is instructed to start printing the product inspection jobs by pressing the button 806. If the instruction to start printing the product inspection jobs is issued, the external controller 102 inputs print data to the printing apparatus 107 and instructs the product inspection apparatus 109 to convey a print sheet subjected to printing. If the print sheet is conveyed, the product inspection apparatus 109 reads an image of the print sheet and performs the product inspection process.

If a "cancel" button 807 is pressed, the screen 800 transitions to the screen 700, for example.

Figure 12:
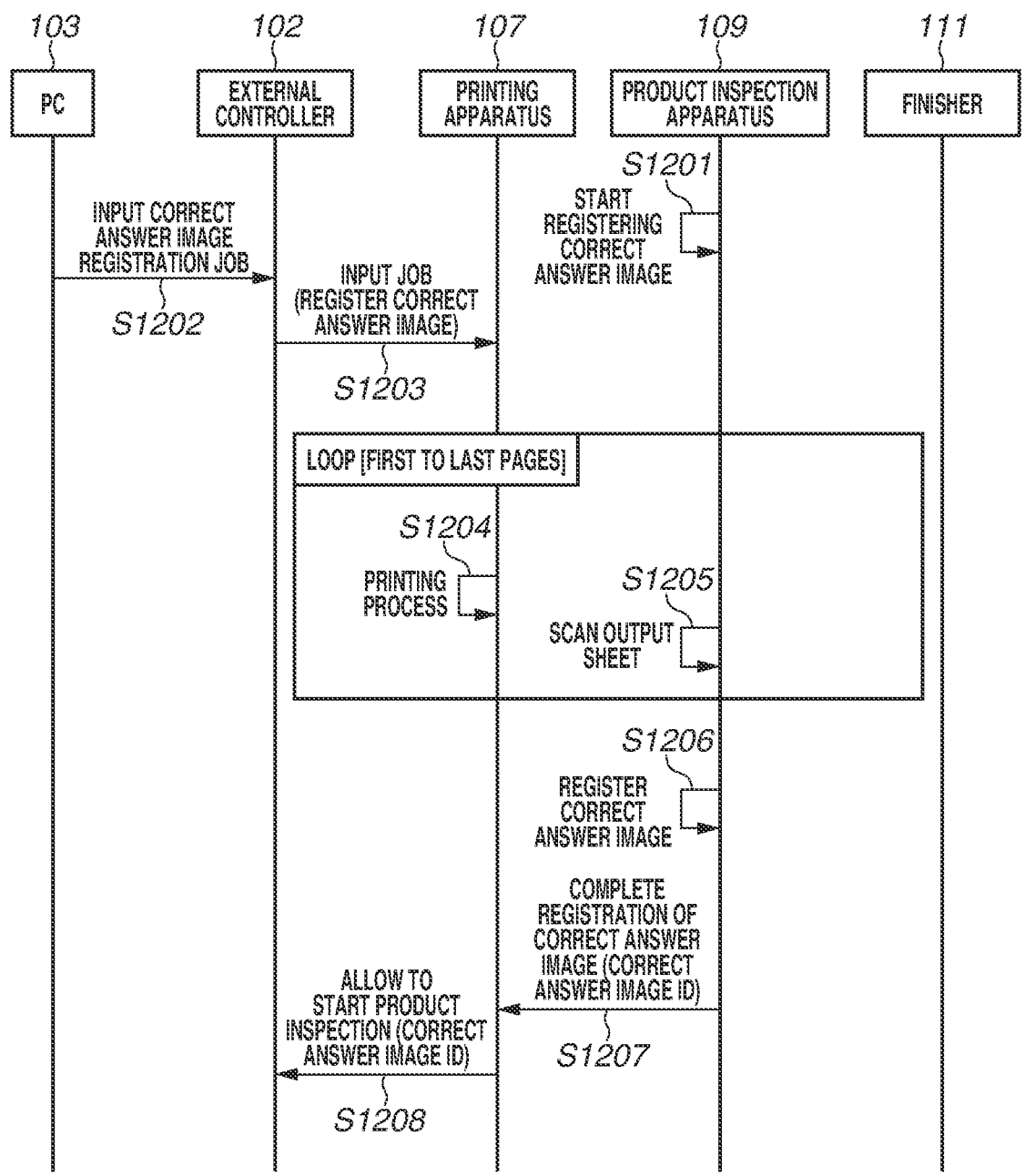
FIG. 12 is a sequence diagram illustrating an example of processing of registering the correct answer image in the product inspection apparatus.

With reference to FIG. 12, a description is given of a sequence for registering the correct answer image in the product inspection apparatus 109.

The detailed operation of each apparatus is as described with reference to FIG. 2, and processing specialized in the registration of the correct answer image according to the present exemplary embodiment is described here.

First, in step S1201, the operator presses the "register correct answer image" button 403 illustrated in FIG. 4 by using the operation unit 242 of the product inspection apparatus 109.

Next, in step S1202, the operator presses the button 803 illustrated in FIG. 8 on the external controller 102. As a result, the PC 103 inputs a correct answer image registration job to the external controller 102 via the external LAN 104. At this time, the PC 103 adds information indicating a job for registering the correct answer image to print data.

In step S1203, the external controller 102 inputs a print job to the printing apparatus 107 via the internal LAN 105 and the video cable 106. Also at this time, the external controller 102 adds information indicating a job for registering the correct answer image to the print data.

If the print job from the external controller 102 is input to the printing apparatus 107, then in step S1204, the printing apparatus 107 interprets the print data and prints image data based on various settings.

In step S1205, when a sheet output from the printing apparatus 107 passes through the product inspection apparatus 109, the image capturing unit 240 of the product inspection apparatus 109 scans an image on the sheet and stores the image in the memory 239. The processes in steps S1204 and S1205 are repeated on all the sheets of the input print data. If all the sheets are obtained, the product inspection apparatus 109 displays the screen 500 on the operation unit 242. If the operator presses the "register" button 505, then in step S1206, all the scanned images are stored as a group of correct answer images in the HDD 272. At this time, the product inspection apparatus 109 determines a unique ID for the stored group of correct answer images (hereinafter, this ID will be referred to as a "correct answer image group ID"). Thus, the correct answer image group ID is an ID unique to the correct answer images composed of a plurality of sheets. Then, in step S1207, the product inspection apparatus 109 notifies the printing apparatus 107 that the registration of the correct answer images is completed. At this time, the product inspection apparatus 109 also notifies the printing apparatus 107 of the correct answer image group ID determined in step S1206 together with the completion of the registration. In step S1208, the printing apparatus 107 notifies the external controller 102 that the registration of the correct answer images is completed, and also notifies the external controller 102 of the correct answer image group ID of which the printing apparatus 107 is notified by the product inspection apparatus 109. The external controller 102 stores the correct answer image group ID of which the external controller 102 is notified by the printing apparatus 107 in association with the print data input in step S1202 and the image data in the HDD 210.

In the above description, the product inspection apparatus 109 determines the correct answer image group ID. Alternatively, a configuration may be employed in which the external controller 102 or the printing apparatus 107 determines the correct answer image group ID. In the above description, the image obtained by scanning the sheet output from the printing apparatus 107 is the correct answer image. Alternatively, an RIP image may be used as the correct answer image. Specifically, RIP data obtained by the printing apparatus 107 performing an RIP process for the correct answer image on the image data to be output to the sheet may be used as the correct answer image.

Figure 9A:
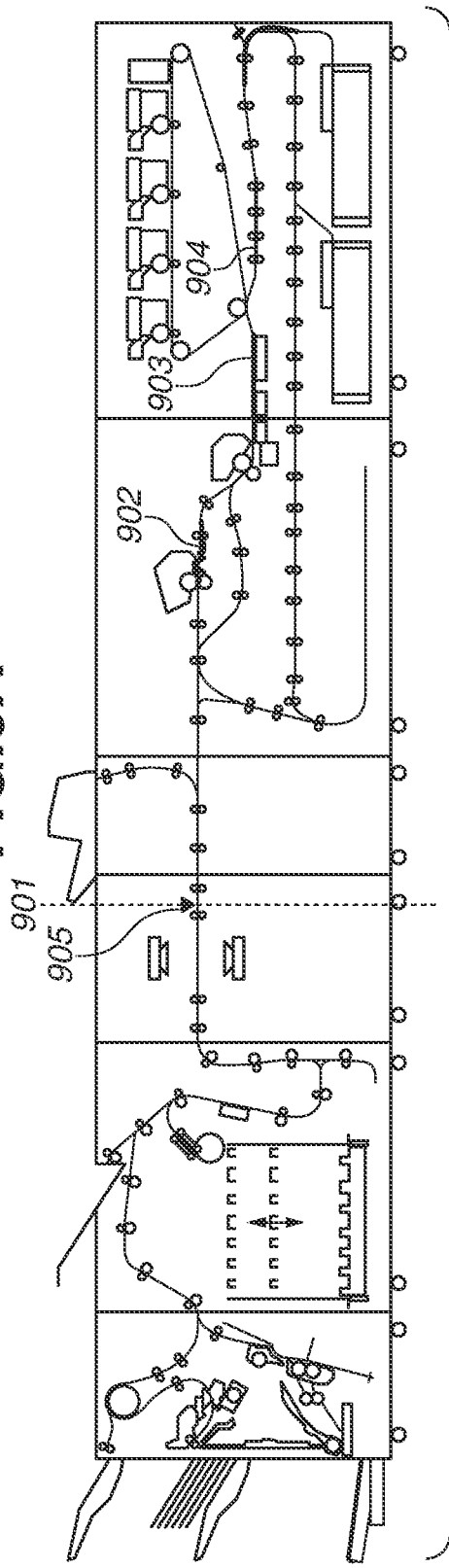
FIGS. 9A and 9B are diagrams illustrating examples of a positional relationship between a jam sheet and a product inspection completion boundary.
Figure 9B:
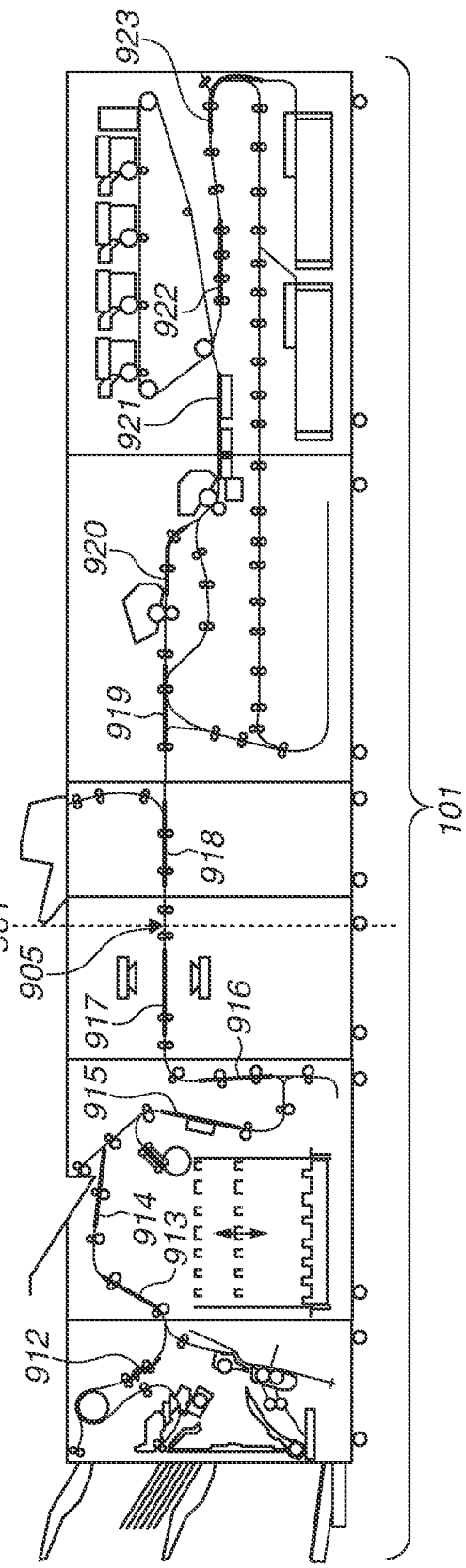

FIGS. 9A and 9B are diagrams illustrating the positional relationship between a jam sheet in the printing apparatus 107 and a product inspection completion boundary 901. FIGS. 9A and 9B illustrate the mechanical cross-sectional view in FIG. 3 in a simplified manner. FIGS. 9A and 9B illustrate the flow of print products (902, 903, and 912 to 921) obtained by printing images on recording sheets and recording sheets (904, 905, 922, and 923) on a sheet conveying path in the image forming apparatus 101.

The product inspection completion boundary 901 is a boundary for separating a print product on which the product inspection is completed by the product inspection apparatus 109, and a print product on which the product inspection is not completed. The product inspection completion boundary 901 is merely a conceptional boundary used as a criterion. FIGS. 9A and 9B are diagrams illustrating a jam that occurs during the product inspection process in the product inspection apparatus 109, and the difference in the method for recovering from the jam depending on the position where the jam occurs.

FIG. 9A illustrates an example of the state where the image forming apparatus 101 stops in a case where a jam occurs in a sheet upstream (on the sheet feeding device side) of the product inspection apparatus 109. A sheet 902 causes the jam, and subsequent sheets 903 to 904 that are already fed are also treated as jam sheets. Thus, if the print job is resumed after the jam sheets are removed by jam clearance, the printing is resumed from an image printed on the sheet 902. In the present exemplary embodiment, the image forming apparatus 101 does not immediately stop at the timing when the jam occurs in the sheet 902, but performs the product inspection on a sheet (not illustrated) downstream of the sheet 902 as a valid sheet and discharges the sheet to a sheet discharge tray.

If the rear end of a sheet passes through a sheet detection sensor 905 at the position of the product inspection completion boundary 901, the product inspection on the sheet is completed. If the rear end of the sheet does not pass through the sheet detection sensor 905, the product inspection on the sheet is not completed. In the state of FIG. 9A, all the jam sheets 902 to 904 are upstream (on the printing apparatus 107 side or the inserter 108 side) of the product inspection completion boundary 901, and a jam sheet that is not subjected to the product inspection is not present. Thus, no particular issue arises.

FIG. 9B illustrates the state where the printing apparatus 107 stops in a case where a jam occurs in a sheet downstream (on the large-capacity stacker 110 side or the finisher 111 side) of the product inspection completion boundary 901. A sheet 912 causes the jam, and subsequent sheets 913 to 923 that are already fed are also treated as jam sheets. Thus, if the print job is resumed after the jam sheets are removed by jam clearance, the printing is resumed from an image printed on the sheet 912.

In FIG. 9B, the sheets 912 to 917 have passed through the product inspection completion boundary 901 and thus are already subjected to the product inspection. Particularly, the sheets 912 to 914 are normal sheets, but will be subjected to the printing again when the printing is resumed after the jam clearance, and will be subjected to the product inspection again. Thus, an issue described below with reference to FIGS. 10A to 10E arises.

FIGS. 10A to 10E are diagrams illustrating the pattern of FIG. 9B where sheets are determined as defective sheets in sheet redundancy product inspection due to the occurrence of a jam.

FIG. 10A illustrates sheets of a print job, which is a one-sided print job for eight sheets. In FIGS. 10A to 10E, the first to eighth sheets are represented as "P1" to "P8", respectively. FIG. 10B illustrates an example of a jam state. A description is given on the assumption that the sheet P3 is a sheet that causes the jam. The sheets P1 to P4 have passed through the product inspection completion boundary 901, and thus the product inspection on the sheets P1 to P4 is completed. The sheets P1 and P2 are determined as normal sheets by the product inspection and already discharged to a sheet discharge tray. All the sheets P3 to P8 are jam sheets. The sheets P3 and P4 are determined as normal sheets by the product inspection, and the sheets P5 to P8 are not yet subjected to the product inspection. If jam clearance is performed in the state of FIG. 10B, then as illustrated in FIG. 10C, reprinting is performed from the sheet P3. In this example, sheets to pass through the product inspection apparatus 109 are illustrated in FIG. 10D, and the product inspection is to be performed in this order. Thus, the sheets P3 and P4 are to be subjected to the product inspection twice. Specifically, sheets 1001 and 1002 are the sheets P3 and P4 as jam sheets, and the sheets P3 and P4 are determined as normal sheets by the product inspection at this time. If the printing is resumed after jam clearance, the sheets P3 and P4 corresponding to sheets 1003 and 1004 are to be subjected to the product inspection again. On the other hand, a group of correct answer images registered in the product inspection apparatus 109 is illustrated in FIG. 10E. As a result, the sheets P3 and P4 corresponding to the sheets 1003 and 1004 are to be subjected to the product inspection based on correct answer images P5 and P6 illustrated in FIG. 10E and therefore are to be determined as defective sheets by the product inspection apparatus 109. The sheet P5 and the subsequent sheets in FIG. 10D are also to be similarly subjected to the product inspection based on correct answer images on different pages and therefore are to be determined as defective sheets.

To solve this issue, the operator needs to specify the sheet P3 as a product inspection resumption sheet for the product inspection apparatus 109 through the PC 103 and then resume the printing.

Although the description is given using a one-sided print job as an example, also in a case where the sheets in FIGS. 10A to 10E are replaced by those of a two-sided print job and a jam occurs in the sheet P3, reprinting is performed from the sheet P3 similarly to the one-sided print job. Thus, the operator needs to specify the front side of the sheet P3 as a product inspection resumption sheet for the product inspection apparatus 109 through the PC 103 and then resume the print job. In the configuration illustrated in FIG. 3, since images printed on both sides are scanned using the cameras 331 and 332 installed at the same conveyance position, this does not lead to a situation where only the front side is already subjected to the product inspection and the back side is not yet inspected. Even in a situation where only one side is already subjected to the product inspection due to a configuration in which the installation positions of the cameras are different from each other, both sides of a sheet in which a jam occurs are subjected to reprinting. Thus, the operator needs to specify the front side of the sheet in which the jam occurs for the product inspection apparatus 109 and then resume the printing.

In FIGS. 9A and 9B and FIGS. 10A to 10E, the description has been given on the premise that the process of printing for recovery from a jam is performed by performing reprinting from the sheet in which the jam occurs. The printing for recovery from a jam, however, is not limited to reprinting from the sheet in which the jam occurs. For example, the image forming apparatus 101 may be stopped at the timing when a jam occurs, and all the sheets present on a conveying path when the image forming apparatus 101 is stopped may be determined as jam sheets. Then, reprinting may be performed from the furthest downstream sheet on the conveying path. Thus, the present exemplary embodiment is not limited to the configuration described above.

Figure 11:
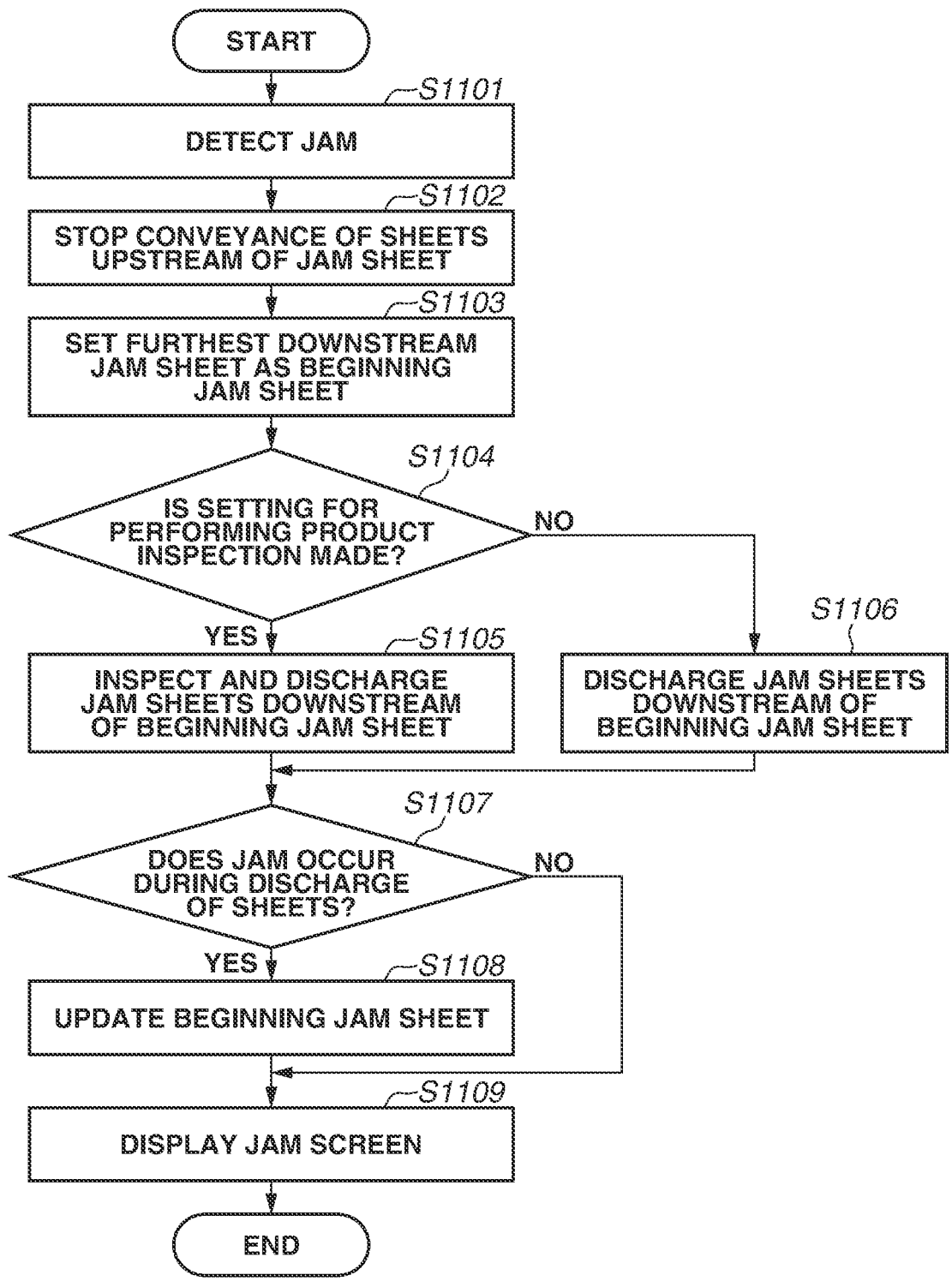
FIG. 11 is a flowchart illustrating an example of processing from occurrence of a jam to a stop of a printing apparatus.

FIG. 11 is a flowchart illustrating processing from the occurrence of a jam to the stop of the printing apparatus 107. A program for the printing apparatus 107 related to the processing in this flowchart is stored in the HDD 221, loaded into the memory 223, and executed by the CPU 222.

In step S1101, the printing apparatus 107 detects a jam. Not only the printing apparatus 107 but also any apparatus in the image forming apparatus 101 can detect a jam. If an apparatus other than the printing apparatus 107 detects a jam, the printing apparatus 107 is notified of the occurrence of the jam via the communication cable 254.

In step S1102, the conveyance of sheets (903, 904, and 905 in FIG. 9A) upstream of the sheet in which the jam occurs is stopped. Consequently, all the sheets upstream of the sheet in which the jam occurs are determined as jam sheets and thus are to be manually removed by the operator.

In step S1103, the furthest downstream jam sheet (902 in FIG. 9A) on the sheet conveying path that causes the jam is set as a beginning jam sheet of an internal parameter.

In step S1104, it is determined whether the setting for performing the product inspection is made. If the setting for performing the product inspection is made (Yes in step S1104), the processing proceeds to step S1105. If the setting for not performing the product inspection is made (No in step S1104), the processing proceeds to step S1106. The setting for performing or not performing the product inspection may be made in the non-volatile memory 223 of the printing apparatus 107 by using the operation unit 224, or may be made in a print job from the external controller 102.

In step S1105, sheets downstream of the beginning jam sheet are determined as valid sheets, subjected to the product inspection, and discharged.

Since the setting for performing the product inspection is not made, in step S1106, the sheets downstream of the beginning jam sheet are determined as valid sheets and discharged.

In step S1107, it is determined whether a jam further occurs during the discharge of the sheets in step S1105 or S1106. If a jam occurs (Yes in step S1107), the processing proceeds to step S1108. If a jam does not occur (No in step S1107), the processing proceeds to step S1109.

Since a jam occurs further downstream of the beginning jam sheet set in step S1103, in step S1108, the beginning jam sheet is updated.

In step S1109, although not illustrated, a jam screen that is a screen instructing the operator to remove jam sheets is displayed on the operation unit 224.

Figure 13:
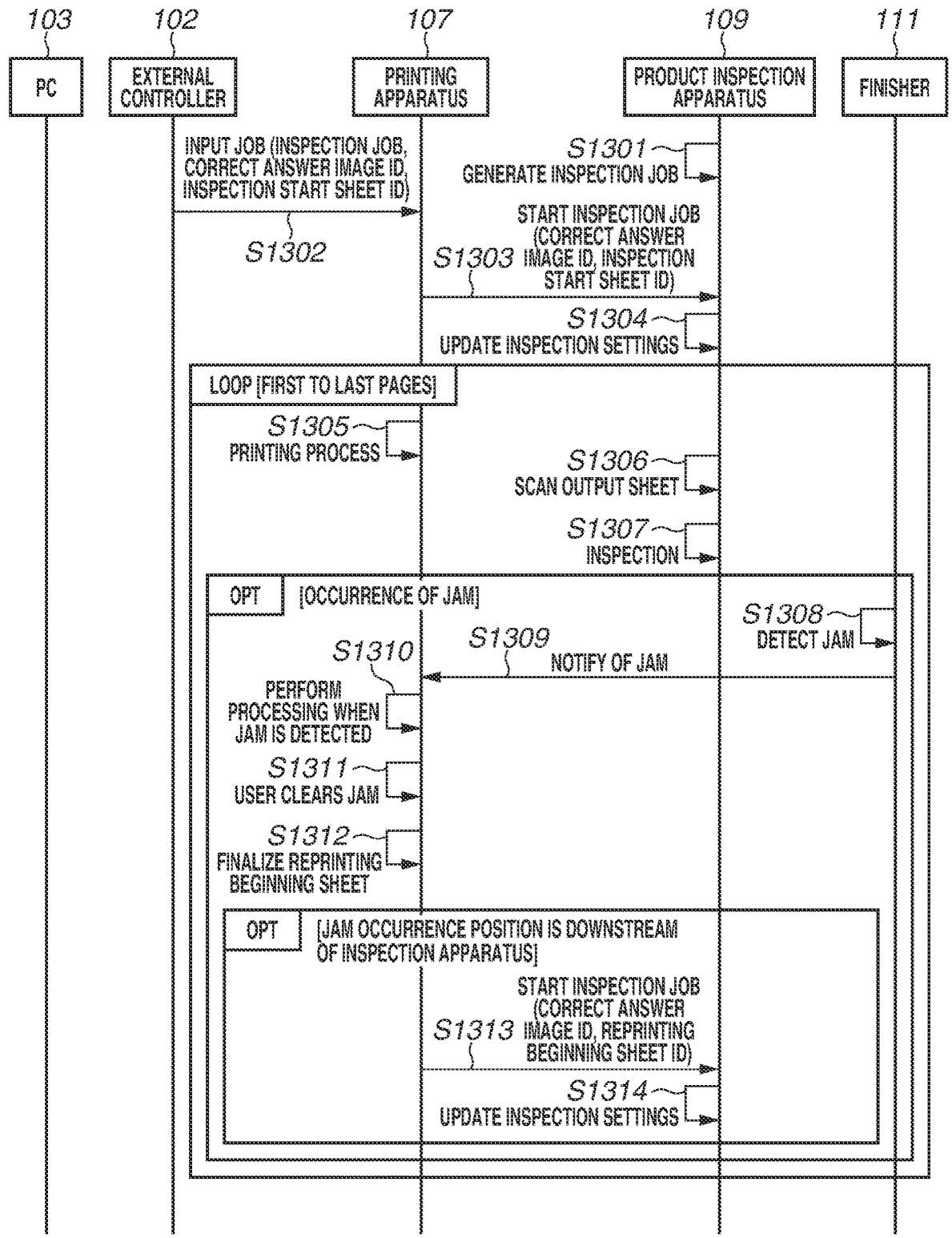
FIG. 13 is a sequence diagram illustrating an example of a job flow when a jam occurs according to a first exemplary embodiment.

Next, with reference to FIG. 13, a description is given of a sequence in a case where a jam occurs in the finisher 111 during the execution of a product inspection job. The detailed operation of each apparatus is as described with reference to FIG. 2, and processing specialized in a jam during a product inspection job according to the present exemplary embodiment is described here.

In step S1301, the operator selects correct answer images with which the operator wishes to perform the product inspection, and presses the "start product inspection" button 406 on the screen 600 illustrated in FIG. 6 on the PC 103. Next, the operator selects the same correct answer images as those in step S1301 on the screens 700 and 800 illustrated in FIGS. 7 and 8 on the external controller 102 and presses the "start printing" button 806 on the screen 800. Consequently, in step S1302, the external controller 102 inputs a selected print job to the printing apparatus 107 via the internal LAN 105 and the video cable 106.

At this time, the external controller 102 searches the HDD 272 for a correct answer image group ID corresponding to the selected correct answer images and adds information indicating a product inspection target job, the correct answer image group ID, and a sheet ID of a sheet from which the product inspection is to be started to print data. Hereinafter, the sheet ID of the sheet from which the inspection is to be started will be referred to as an "inspection start sheet ID". The correct answer image group ID and the sheet ID are collectively referred to as "identification information". The inspection start sheet ID is used to notify the printing apparatus 107 of the ordinal number of the sheet in the correct answer images from which the inspection is to be started. If the print job from the external controller 102 is input to the printing apparatus 107, then in step S1303, the printing apparatus 107 notifies the product inspection apparatus 109 of the start of a product inspection job. At this time, the printing apparatus 107 adds the correct answer image group ID and the product inspection start sheet ID of which the printing apparatus 107 is notified by the external controller 102 in step S1302.

In step S1304, the product inspection apparatus 109 confirms settings which are made through the printing apparatus 107 and of which the product inspection apparatus 109 is notified with the start of the product inspection job. If necessary, the product inspection apparatus 109 updates the settings of the product inspection job generated in step S1301.

Next, in step S1305, the printing apparatus 107 interprets the print data and prints image data based on various settings.

In step S1306, when a sheet output from the printing apparatus 107 passes through the product inspection apparatus 109, the image capturing unit 240 of the product inspection apparatus 109 scans an image on the sheet, thereby generating a scanned image of the sheet. Then, in step S1307, the product inspection apparatus 109 compares the scanned image with a corresponding one of the correct answer images. The processes of steps S1305 to S1307 are repeatedly performed on all the sheets of the input print data. If a jam occurs in any apparatus in the image forming apparatus 101 during this process, the processing in step S1308 and subsequent steps (described below) is performed.

As an example, a case is described where a jam occurs in the finisher 111. In step S1308, the finisher 111 detects the occurrence of a jam.

In step S1309, the finisher 111 notifies the printing apparatus 107 of the occurrence of the jam.

The information of which the finisher 111 notifies the printing apparatus 107 at this time includes the jam occurrence position, which is required for the printing apparatus 107 to perform the operation of recovering from the jam, and a jam sheet ID for notifying the printing apparatus 107 of the ordinal number of the page of the print job in which the jam occurs. If a jam occurs in another apparatus, the apparatus that detects the jam issues a similar notification to the printing apparatus 107 as in the example where a jam occurs in the finisher 111.

In step S1310, the printing apparatus 107 performs the processing described in steps S1107 to S1109 in FIG. 11 to display the jam screen on the operation unit 224. In step S1311, the operator views the jam screen and removes jam sheets in the printing apparatus 107.

In step S1312, based on information regarding the beginning jam sheet updated in step S1108 in FIG. 11, the printing apparatus 107 determines a beginning sheet for reprinting. Although steps S1311 and S1312 are described in this order, the operator performs the jam clearance at any timing chosen by the operator, and thus the order of processes can also be steps S1312 and S1311.

Next, the printing apparatus 107 determines whether the jam occurrence position of which the printing apparatus 107 is notified by the finisher 111 in step S1309 is downstream of the product inspection completion boundary 901 described with reference to FIGS. 9A and 9B. If the jam occurrence position is downstream of the product inspection completion boundary 901, then in step S1313, the printing apparatus 107 notifies the product inspection apparatus 109 of the start of the product inspection job again. At this time, the printing apparatus 107 notifies the product inspection apparatus 109 of the correct answer image group ID of which the printing apparatus 107 is notified by the external controller 102 in step S1302 and information regarding a beginning sheet ID of the beginning sheet for the reprinting determined by the printing apparatus 107 in step S1312. The beginning sheet ID is an ID for notifying the product inspection apparatus 109 of the ordinal number of the sheet of the print job from which the reprinting is to be performed.

In step S1314, the product inspection apparatus 109 confirms information set through the printing apparatus 107. If necessary, the product inspection apparatus 109 updates the settings of the product inspection job generated in step S1301. In the examples of FIGS. 10A to 10E, when the jam occurs, the product inspection start sheet ID is set by the product inspection apparatus 109 to the sheet P5, which will be subjected to the product inspection next. However, the beginning sheet ID for the reprinting determined by the printing apparatus 107 is the sheet P3, and thus the product inspection apparatus 109 changes the setting of the product inspection start sheet ID from the sheet P5 to the sheet P3. Further, the product inspection apparatus 109 deletes the product inspection results of the sheets P3 and P4 already subjected to the product inspection at this time. Then, the processing returns to step S1305, and in step S1305, the printing apparatus 107 resumes the printing from the sheet P3.

Although the beginning sheet ID is used in step S1314, a method may be employed in which the printing apparatus 107 notifies the product inspection apparatus 109 without using the beginning sheet ID. This method is described below. Based on the jam sheet ID and sheet information regarding a sheet having passed through the product inspection completion boundary 901 that is acquired from the sheet detection sensor 905, the printing apparatus 107 determines the number of sheets that are sheets already subjected to the product inspection and also jam sheets. In the examples of FIGS. 10A to 10E, sheets that are sheets already subjected to the product inspection and also jam sheets correspond to the sheets P3 and P4. Thus, the printing apparatus 107 determines that the number of sheets is two. The printing apparatus 107 notifies the product inspection apparatus 109 of the determined number "two" as a product inspection result deletion ID. If the product inspection apparatus 109 receives the product inspection result deletion ID, the product inspection apparatus 109 deletes the product inspection results of the sheets P3 and P4 already subjected to the product inspection. Then, the processing returns to step S1305, and in step S1305, the printing apparatus 107 resumes the printing from the sheet P3.

The image scanned by the product inspection apparatus 109 in step S1306 is an image of the sheet P3 and matches the product inspection start sheet ID of which the setting is previously changed by the product inspection apparatus 109. Thus, in step S1307, the product inspection apparatus 109 can perform correct product inspection without a shift in the comparison target.

In the sequence described with reference to FIG. 13, if a jam occurs, the printing apparatus 107 notifies the product inspection apparatus 109 of the beginning sheet ID for the reprinting. Alternatively, an apparatus in which the jam occurs may directly notify the product inspection apparatus 109 of the beginning sheet ID.

In the first exemplary embodiment, a description is given of the sequence where the external controller 102 separately inputs the correct answer image registration job and the product inspection target job. Alternatively, a configuration may be employed in which the external controller 102 inputs the correct answer image registration job and the product inspection target job as a single job, and the printing apparatus 107 executes each of the correct answer image registration job and the product inspection target job.

A description has been given above of the sequence where the printing apparatus 107 recovers from a jam. Depending on the external controller 102, however, the external controller 102 may recover from a jam. Specifically, this processing is as follows. If a jam occurs, the external controller 102 cancels a job that is in a suspended state due to the occurrence of the jam, generates a new print job composed of subsequent sheets, and inputs the job to the printing apparatus 107.

Figure 14:
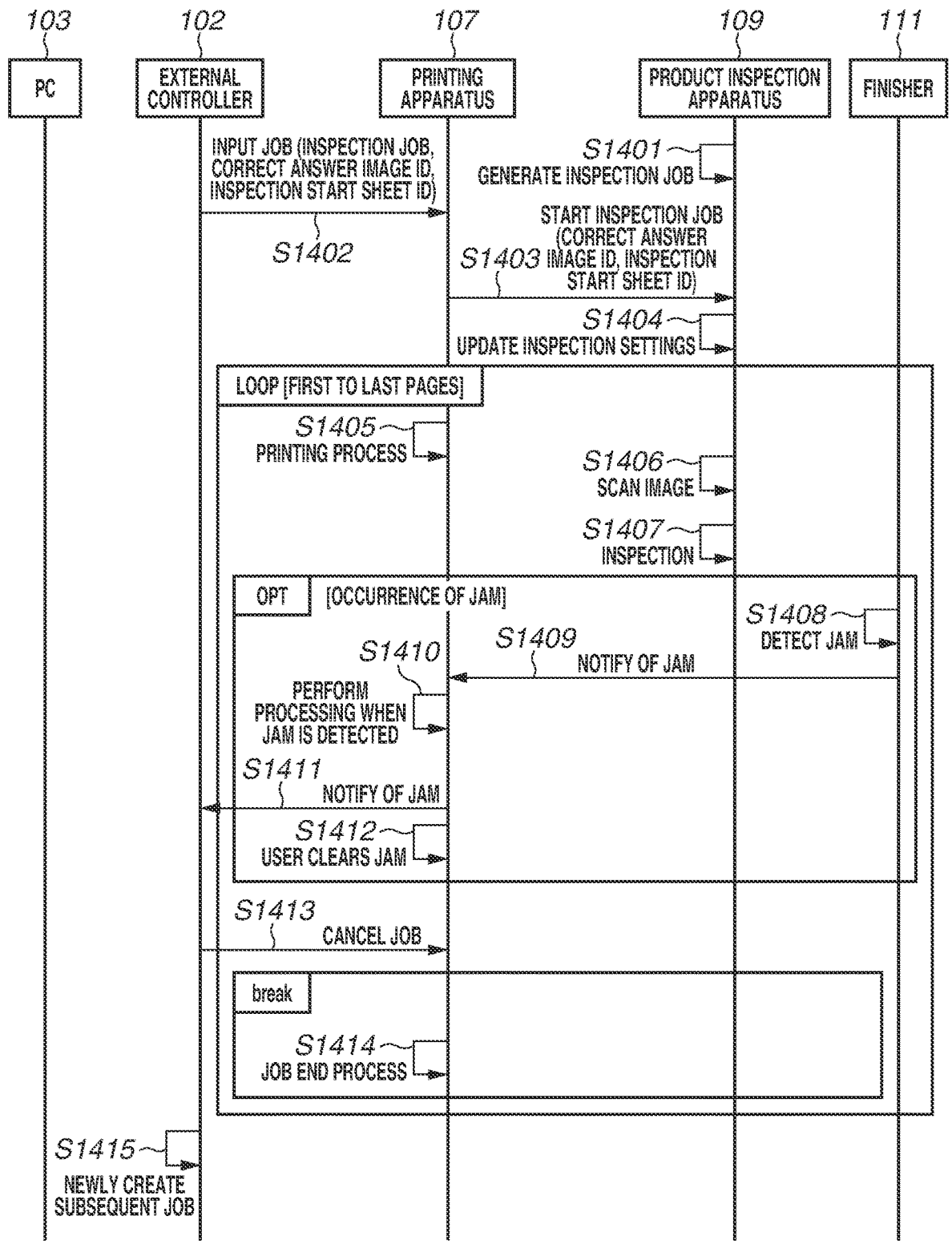
FIG. 14 is a sequence diagram illustrating an example of a job flow when a jam occurs according to a second exemplary embodiment.

With reference to FIG. 14, a description is given of a sequence in a case where a jam occurs during the execution of a product inspection job, and the external controller 102 recovers from the jam. The detailed operation of each apparatus is as described with reference to FIG. 2, and processing specialized in a jam during a product inspection job is described here.

The processes of steps S1401 to S1410 are similar to those of steps S1301 to S1310 in the sequence described with reference to FIG. 13, and therefore, step S1411 and subsequent steps are described. In step S1411, the printing apparatus 107 notifies the external controller 102 that the jam occurs.

In step S1412, the operator removes jam sheets in the printing apparatus 107.

In step S1413, the external controller 102 requests the printing apparatus 107 to cancel the print job input in step S1402.

In step S1414, based on the request from the external controller 102, the printing apparatus 107 performs a cancellation process for cancelling the print job that is being suspended. The printing apparatus 107 performs the cancellation process, thereby deleting information regarding the print job from the memory 223 of the printing apparatus 107.

In step S1415, based on information regarding the jam notification in step S1411, the external controller 102 identifies a sheet that needs to be subjected to reprinting. Then, the external controller 102 generates a new print job composed of pages of the identified sheet and subsequent sheets. From this point onward, the processing is similar to that in the sequence for inputting the product inspection target job and therefore proceeds to step S1402.

In step S1402, the external controller 102 inputs the new print job to the printing apparatus 107. At this time, as the product inspection target job and the correct answer image group ID, the same parameters as those of the job before the occurrence of the jam are specified. As the product inspection start sheet ID, an ID is specified that indicates the ordinal number of the sheet in the correct answer images to which the beginning sheet of the newly input print job corresponds.

In step S1403, the printing apparatus 107 notifies the product inspection apparatus 109 of the start of a product inspection job together with the information regarding the correct answer image group ID and the product inspection start sheet ID of which the printing apparatus 107 is notified by the external controller 102.

In step S1404, the product inspection apparatus 109 confirms settings which are made through the printing apparatus 107 and of which the product inspection apparatus 109 is notified with the start of the product inspection job. If necessary, the product inspection apparatus 109 updates the settings of the product inspection job generated in step S1401. The product inspection apparatus 109 is in the state where the product inspection apparatus 109 does not recognize that the job processed by the printing apparatus 107 before the occurrence of the jam is cancelled, and that the new job is input from the external controller 102. In the examples of FIGS. 10A to 10E, this is the state where the product inspection apparatus 109 waits for a scanned image of the sheet P5. The external controller 102, however, inputs the job with the product inspection start sheet ID indicating the sheet P3. If the product inspection apparatus 109 receives the product inspection start sheet ID, the product inspection apparatus 109 changes the setting of the product inspection start sheet ID from the sheet P5 to the sheet P3. Further, the product inspection apparatus 109 deletes the product inspection results of the sheets P3 and P4 already subjected to the product inspection at this time.

Then, the processes of steps S1405 to S1414 are repeated until printing on all the sheets is completed.

As described above, even if the external controller 102 recovers from a jam, the external controller 102 issues a notification of the product inspection start sheet ID, and based on information regarding the product inspection start sheet ID, the product inspection apparatus 109 updates the setting of the product inspection and thereby can perform correct product inspection without a shift in the comparison target.

Other Exemplary Embodiments

While various examples and exemplary embodiments of the present disclosure have been described above, the spirit and scope of the present disclosure are not limited to a particular description in the specification.

Embodiments of the present disclosure can also be achieved by the process of supplying a program for achieving one or more functions of the above exemplary embodiments to a system or an apparatus via a network or a storage medium, and of causing one or more processors of a computer of the system or the apparatus to read and execute the program. Embodiments of the present disclosure can also be achieved by a circuit (e.g., an application-specific integrated circuit (ASIC)) for achieving the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-131093, filed Aug. 11, 2021, which is hereby incorporated by reference herein in its entirety.

What is claimed is:

1. A printing system comprising:
one or more controllers having one or more processors and one or more memories, the one or more controllers configured to function as:
a printing unit configured to print an image on a recording sheet;
a storage unit configured to store a plurality of correct answer images;
a generation unit configured to read a print product obtained by the printing unit printing the image on the recording sheet and generate a scanned image;
a product inspection unit configured to perform product inspection on the print product based on the scanned image generated by the generation unit and the correct answer images stored in the storage unit;
a post-processing unit configured to perform post-processing on the print product;
a control unit configured to, upon occurrence of a jam in the print product, control the printing unit to perform reprinting; and
a notification unit configured to, upon the occurrence of the jam while the post-processing unit performs the post-processing on the print product, notify the product inspection unit of identification information regarding the print product on which printing is started by the reprinting,
wherein based on the identification information, the product inspection unit references any of the correct answer images corresponding to the scanned image generated by the reprinting based on the control of the control unit and performs the product inspection on the print product.

2. The printing system according to claim 1, wherein the product inspection unit performs the product inspection on the print product based on the scanned image generated by the generation unit and any of the correct answer images corresponding to the scanned image and stored in the storage unit.

3. The printing system according to claim 1, wherein the identification information includes a correct answer image group identifier (ID) of a group of correct answer images to which a correct answer image corresponding to the print product subjected to the reprinting by the control unit belongs, and a sheet ID indicating an ordinal number of a sheet in the group of correct answer images.

4. The printing system according to claim 3, further comprising at least a printing apparatus and a post-processing apparatus,
wherein in a case where the jam occurs, the post-processing apparatus notifies the printing apparatus of information regarding the print product in which the jam occurs, and the printing apparatus identifies the correct answer image group ID and the sheet ID based on the information regarding the print product.

5. The printing system according to claim 1, wherein the identification information is an instruction to delete a result of the product inspection performed by the product inspection unit.

6. The printing system according to claim 1, wherein the plurality of correct answer images includes scanned images acquired by the generation unit.

7. The printing system according to claim 1, wherein the plurality of correct answer images includes image data subjected to a raster image processor (RIP) process.

8. The printing system according to claim 1, wherein the post-processing unit performs the post-processing on the print product after the product inspection unit performs the product inspection on the print product.

9. The printing system according to claim 1, wherein the post-processing unit performs at least one of a stapling process, a punching process, and a saddle stitch binding process on the print product.

10. The printing system according to claim 1, wherein in a case where the jam occurs in a print product that is not subjected to the product inspection by the product inspection unit, the notification unit does not issue the notification.

11. The printing system according to claim 1, further comprising:
a printing apparatus including the printing unit;
a product inspection apparatus including the storage unit, the generation unit, and the product inspection unit; and a post-processing apparatus including the post-processing unit.

12. The printing system according to claim 1, wherein the print product on which the printing is started by the reprinting is a print product in which the jam occurs.

13. A control method for controlling a printing system, the control method comprising:
   printing an image on a recording sheet;
   storing a plurality of correct answer images;
   reading a print product obtained by printing the image and generating a scanned image;
   performing product inspection on the print product based on the scanned image generated by the generation unit and the correct answer images stored in the storage unit;
   performing post-processing on the print product;
   in a case where a jam occurs in the print product, performing control to perform reprinting; and
   in a case where the jam occurs while the post-processing is performed, issuing a notification of identification information regarding the print product on which printing is started by the reprinting,
   wherein based on the identification information, any of the correct answer images corresponding to the scanned image is referenced, and the product inspection is performed on the print product.

14. A non-transitory storage medium that stores a program for causing a computer to execute the control method according to claim 13.

* * * * *